Sept. 18, 1945. J. C. NILSSON ET AL 2,385,157
INSIDE DIAMETER MEASURING AND INDICATOR GAUGE
Filed Jan. 21, 1944 2 Sheets-Sheet 1
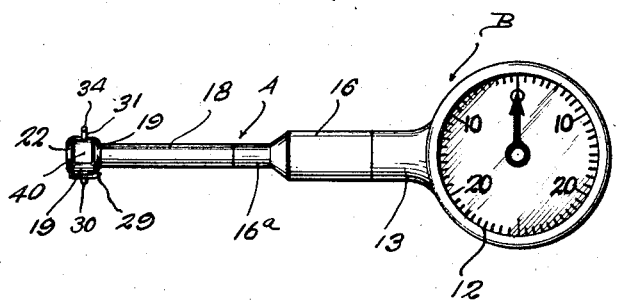
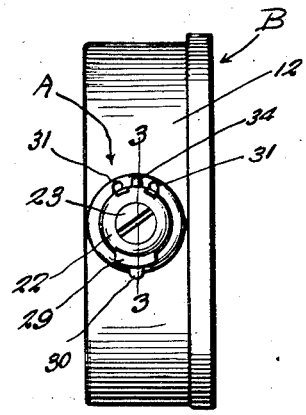
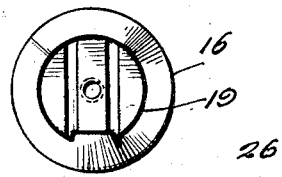
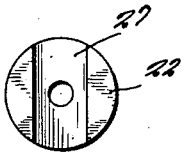
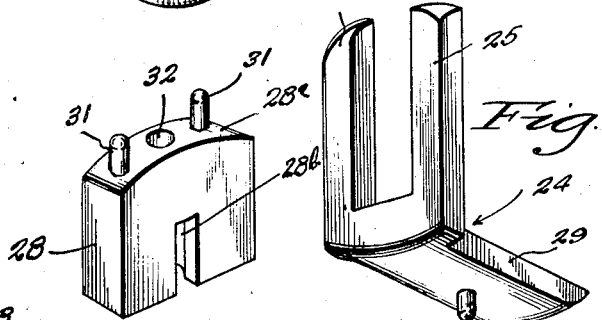
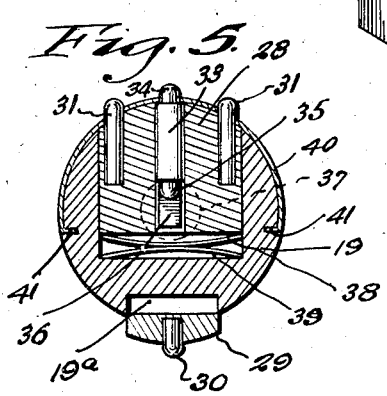
Inventors
John C. Nilsson
John F. Nilsson
By Clarence A. O'Brien
and Harvey B. Jacobson
Attorneys

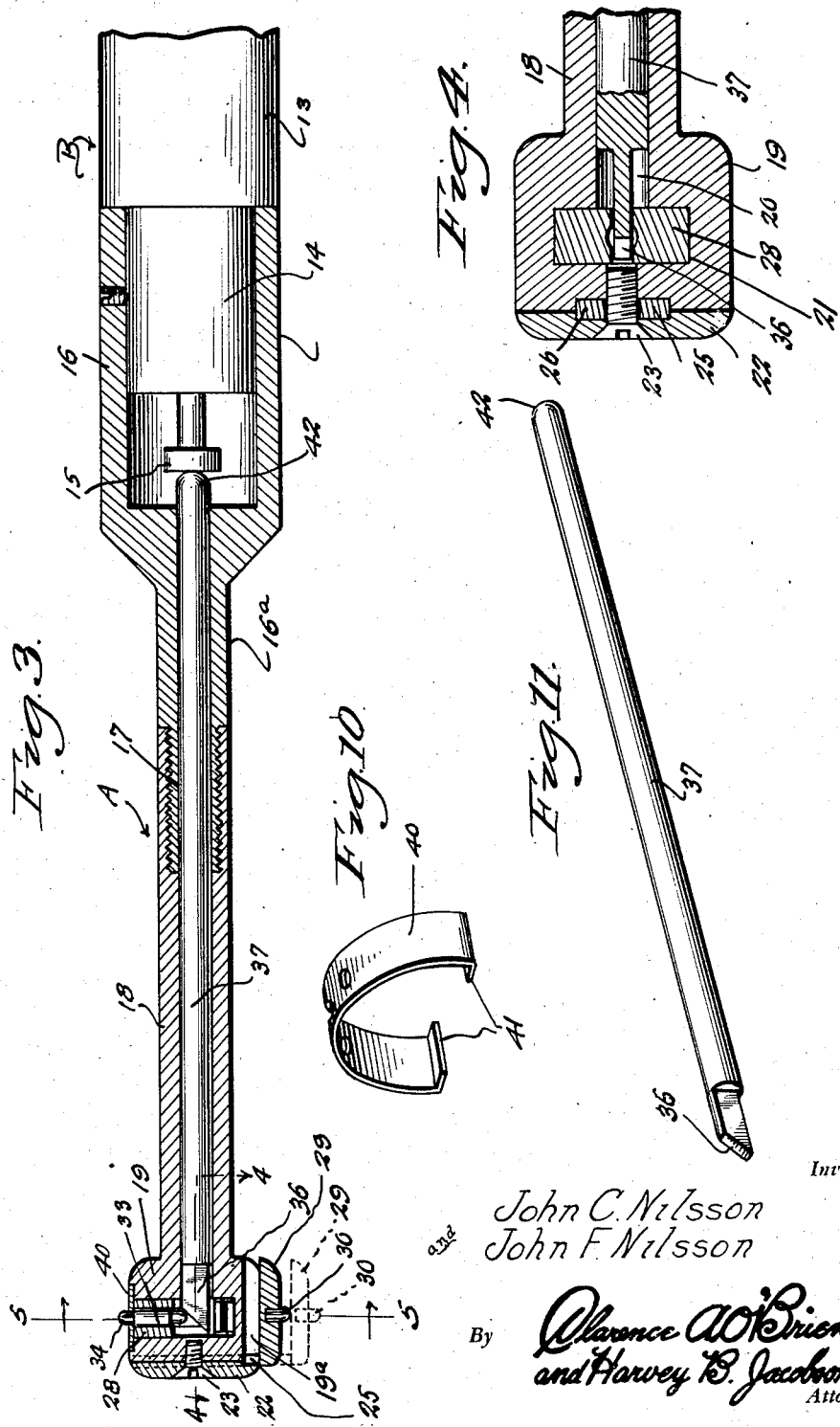

Patented Sept. 18, 1945

2,385,157

UNITED STATES PATENT OFFICE 2,385,157

INSIDE DIAMETER MEASURING AND INDICATOR GAUGE

John C. Nilsson and John F. Nilsson, Poughkeepsie, N. Y., assignors to Nilsson Gage Company, Inc., Poughkeepsie, N. Y.

Application January 21, 1944, Serial No. 519,170

12 Claims. (Cl. 33—178)

This invention relates to so-called inside diameter measuring and indicating gauges and has more particular reference to a style and type which is particularly designed for diameter gauging of small bores ranging from ⅛ to 1 inch, and my primary purpose is to provide an instrument in this category which, compared to similar gauges, is possessed of structural features of refinement which promote precision use by machinists and the like.

More specifically, we have in mind an inside diameter gauge which is highly efficient and accurate, characterized by a tubular stem so constructed as to accommodate a detachable dial equipped gauge-indicator or other tell-tale device on one end, and a slidable but non-rotatable rod passing through the stem and a specifically constructed head containing mechanism for actuating the rod on the other end of the stem.

Novelty is also predicated upon the special head construction, this being provided with a spring-pressed slidable block having feeler pins, and a relatively slidable actuator having cam coaction with the aforementioned rod for purposes of permitting sensitive reciprocation of said rod.

A further feature is the incorporation in the head of a detachable, L-shaped adapter having conveniently constructed and arranged means for adjustably supporting it in an operating position on the coacting head on one leg of the L and a fixed feeler pin or button on the other leg of the L.

Other features and advantages will become more readily apparent from the following description and the accompanying illustrative drawings.

In the drawings, wherein like numerals are employed to designate like parts throughout the same—

Figure 1 is a side elevational view of the complete measuring and indicator gauge as constructed in accordance with the principles of the instant invention.

Figure 2 is an enlarged end elevation of the arrangement seen in Figure 1, that is, a view observing the structure in a direction from left to right.

Figure 3 is a fragmentary longitudinal sectional view, with certain parts in elevation, said view being on the plane of the line 3—3 of Figure 2.

Figures 4 and 5 are enlarged sections at right angles to each other taken on the planes of the lines 4—4 and 5—5, respectively, of Figure 3, looking in the direction of the indicating arrows.

Figure 6 is a perspective view of the bifurcated feeler block which is incorporated in the head construction.

Figure 7 is a perspective view, on an enlarged scale, of the fork-equipped adjusting adapter member.

Figure 8 is an end view of the head with the adapter retaining element or cap removed.

Figure 9 is an elevational view of the cap per se.

Figure 10 is a perspective view of a longitudinally bowed assembling spring.

Figure 11 is a perspective view of the longitudinally shiftable but non-rotatable gauge operating rod.

Referring now to the drawings by distinguishing reference numerals, it will be seen that the structure, as an entirety is characterized by two main components; namely, A the diameter detecting and gauging instrument, and the dial-equipped result indicator device B.

Considering first the part B, which is a conventional marketed device, this comprises a gauging dial and casing arrangement 12 with an extension 13 having a reduced terminal portion or sleeve 14 as shown in Figure 3, equipped with a headed plunger 15 to operate the mechanism for dialing. The parts 14 and 15 slip telescopically into the socket 16, this being an adapter and having a fitting including a tubular bearing 16a and a reduced screw-threaded nipple 17, the latter threading into a socket in the tubular stem portion 18 of the inside diameter calipering device or part A.

As previously indicated, the tubular stem or guide 18 is provided with a special head 19 to contain and properly house the diameter measuring and gauging mechanism. As shown in Figure 4 the head has a bore 20 intersecting a substantially rectangular socket 21 and a cap disk 22 is held on one end of the head by a set screw 23 which parts 22 and 23 serve to hold in place the L-shaped adapter unit 24. As brought out in Figure 7 this is provided with a fork whose arms 25 and 26 fit in a slot or notch 27 in the cap. The end of the head is fashioned as shown in Figure 8 to accommodate the fork arms. The peripheral portion of the head is formed with a groove 19a on one side, this to accommodate the projectible and retractible limb portion 29 of the adapter. This part is provided with a short stud 30 which functions as a feeler element for the head. Or to put it otherwise, the adapter thus adjustably mounted in projectible and retractible position on the head permits the effective diameter of the head to be decreased or increased for adjusting and increasing the utility of this part.

In addition to the adapter attachment 24 being radially projectible and retractible the feeler block 28 is likewise mounted for adjustment. This block as brought out in Figure 6, is substantially rectangular and has a curvate surface 28a and is bifurcated as at 28b. On the curvate end we provide circumferentially spaced feeler studs 31 and between these there is a socket or bore 32 in which the double studded pin 33 is slidably adjustable as shown in Figure 5. This has double studs and, if desired, is reversible. The outer stud coacts with the feeler studs 31 and is differentiated by the numeral 34. The inner stud 35 projects down into the bifurcation and the furcations accommodate the tapered reduced inner end 36 of the projectible gauge actuated rod or pin 37. This part 37 is slidably mounted in the guide tube 18 as well as in the nipple 17, guide bearing 16a and socket 16 but is prevented from rotation in the complete assembly of the same by entrance of the taper cam end 36 in the space 28b in the block 28, this as shown in Figures 3 and 5. Semi-circular flat springs 38 and 39 (see Figure 5) are arranged in the bottom of the aforementioned socket 21 and these serve to project the block 28 outwardly. For purposes of holding the parts assembled we use a substantially semi-circular spring metal band 40 having inturned free ends 41 fitting into notches in adjacent marginal portions of the head as brought out in Figure 5. This assembling band 40 is provided with circumferentially spaced apertures to permit projection therethrough of the feeler studs 31 and the movable feeler pin 33. It is to be noted that the block 28 is movable against the springs 38 and 39 carrying the fixed studs 31 therewith. The feeler pin 33 is relatively movable to the block and constitutes the means for exerting an inward cam stress pressure against the cam end 36 of the gauge operating rod or pin 37. Consequently, we have a pair of feeler studs 31 on one side with a cam actuating pin therebetween and a diametrically opposite feeler stud 30 on the adapter device 24, all of these parts being carefully chosen and selected to bring about the various results desired by the user.

It is to be noted that the inner rounded end 42 of the rod 37 (see Figure 3) engages the head on the plunger, that is, the head 15 on the plunger which operates the dial mechanism. Therefore, the parts A and B thus combined serve aptly and adequately for inside bore diameter measurement and dial indicating purposes. It is unnecessary, however, to illustrate or describe various examples because inside gauges are well known and methods of use vary slightly depending on the different jobs encountered, and the modes of procedure and technique pursued by the different users.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having described the invention, what is claimed as new is:

1. As a component part of a structure of the class described, an attachment comprising a fork and a limb at right angles thereto, said limb being provided with a feeler stud.

2. In an inside diameter gauging instrument of the class described, a circular head, circumferentially spaced spring projected feeler studs mounted on a predetermined zone on the peripheral portion of said head, said head being provided on a substantially diametrically opposite zone with a longitudinally extending groove intersecting the adjacent peripheral portion, a substantially L-shaped adapter and diameter varying attachment, one limb thereof being seated in said groove and being radially projectible and retractible in relation to the adjacent peripheral area, said limb being provided with a feeler stud coacting with the first-named feeler studs, the remaining limb being adjustably mounted on the outer end of said head.

3. In an inside diameter gauging instrument of the class described, a circular head, circumferentially spaced spring projected feeler studs mounted on a predetermined zone on the peripheral position of said head, said head being provided on a substantially diametrically opposite zone with a longitudinally extending groove intersecting the adjacent peripheral portion, a substantially L-shaped adapter and diameter adjusting attachment, one limb thereof being seated in said groove and radially projectible and retractible in relation to the adjacent peripheral area, said limb being provided with a feeler stud coacting with the first-named feeler studs, the remaining limb being adjustably mounted on the outer end of said head, said last-named limb being in the form of a fork, said head having a projecting rib constituting a key, the fork arms straddling and slidably coacting with said key, and a cap attached to said head and having its inner face provided with a groove partially receiving said fork arms therein.

4. As a component part of a structural assemblage of the class described, a head diameter increasing and decreasing attachment of L-shaped form comprising a fork constituting one limb thereof, the remaining limb being at right angles to the fork, being externally convex in transverse cross-section and being provided with an outstanding fixedly mounted feeler stud.

5. As a new article of manufacture and as a component part of an inside diameter gauging and calipering instrument of the class described, a substantially rectangular block having its outer end of arcuate form to coact with the circular peripheral rim of an associated head, said block being adapted to fit in a socket in the head, the inner end thereof being bifurcated to straddle an associated right-angularly disposed dial gauge rod, there being a hole formed centrally through said block and opening at its outer end through the arcuate surface, its inner end communicating with the space between the furcations, and a pair of studs embedded in the block and having their outer ends rounded and forming feeler fingers, said outer ends projecting beyond the arcuate outer end of the block.

6. As a new article of manufacture and as a component part of an inside diameter gauging and calipering instrument of the class described, a substantially rectangular block having its outer end of arcuate form to coact with the circular peripheral rim of an associated head, said block being adapted to fit in a socket in the head, the inner end thereof being bifurcated to straddle an associated right-angularly disposed rod, there being a hole formed centrally through said block and opening at its outer end through the arcuate surface, its inner end communicating with the space between the furcations, and a pair of studs embedded in the block and having their outer ends rounded and forming feeler fingers, said outer ends projecting beyond the arcuate outer end of the block, together with a substantially semi-circular spring band having a centrally apertured intermediate portion conforming to the outer end of the block, the apertures permitting protrusion of the feeler fingers therethrough.

7. An inside diameter calipering and gauging instrument for remote control of an associated dial gauge embodying a body having a circular head, the outer perimeter of said head being circular and provided on one side with a groove, an L-shaped radially projectible and retractible diameter increasing and decreasing attachment slidably mounted on said head and one arm thereof being seated in said groove and movable toward and from said perimeter and provided with an outstanding feeler stud, a spring-pressed block mounted in said head and having circumferentially spaced integral studs projecting beyond its outer end as well as beyond the perimeter of the head, said studs being located at points substantially diametrically opposite to the first-named stud.

8. An inside diameter calipering and gauging instrument for remote control of an associated dial gauge embodying a body having a circular head, the outer perimeter of said head being circular and provided on one side with a groove, an L-shaped radially projectible and retractible diameter increasing and decreasing attachment slidably mounted on said head and one arm thereof being seated in said groove and movable toward and from said perimeter and provided with an outstanding feeler stud, a spring-pressed block mounted in said head and having circumferentially spaced integral studs projecting beyond its outer end as well as beyond the perimeter of the head, said studs being located at points substantially diametrically opposite to the first-named stud, said block being provided with a central hole, and a slidable pin mounted in said hole, said pin having its outer end projecting beyond the perimeter of the head and located between the adjacent feeler studs, the inner end being constructed to coordinate with a cam-rod for actuating the dial gauge.

9. An inside diameter calipering and gauging instrument of the class described, comprising a circular head, said head having a substantially rectangular socket, the outer end of the socket opening through the perimeter of the head, a block slidably mounted in said socket, spring-means in the socket interposed between the bottom of the socket and the adjacent surface of said block to exert a constant outward stress on the block, said block being provided with integral circumferentially spaced studs, the outer end of the block being of segmental form and conforming to the perimeter of the head, the studs projecting at their outer ends beyond said segmental end.

10. An inside diameter calipering and gauging instrument of the class described, comprising a circular head, said head having a substantially rectangular socket, the outer end of the socket opening through the perimeter of the head, a block slidably mounted in said socket, spring-means in the socket interposed between the bottom of the socket and the adjacent end of said block to exert a constant outward stress on the block, said block being provided with integral circumferentially spaced studs, the outer end of the block being of segmental form and conforming to the perimeter of the head, the studs projecting at their outer ends beyond said segmental end, said block being centrally bored and having its inner end bifurcated, the bore opening at its inner end in the space between the furcations, a pin slidable in said bore and having its inner and outer ends reduced, the inner reduced end being adapted to coact with a cam on a dial gauge actuating rod, the outer end projecting outwardly through and beyond the bore and the segmental end of the block.

11. An inside diameter calipering and gauging instrument of the class described, comprising a circular head, said head having a substantially rectangular socket, the outer end of the socket opening through the perimeter of the head, spring-means in the socket interposed between the bottom of the socket and the adjacent end of said block to exert a constant outward stress on the block, said block being provided with integral circumferentially spaced studs, the outer end of the block being of segmental form and conforming to the perimeter of the head, the studs projecting at their outer ends beyond said segmental end, said block being centrally bored and having its inner end bifurcated, the bore opening at its inner end in the space between the furcations, a pin slidable in said bore and having its inner and outer ends reduced, the inner end being adapted to coact with a cam on a dial gauge actuating rod, the outer end projecting outwardly through and beyond the bore and the segmental end of the block, and a substantially semi-circular spring metal band embracing one-half portion of the perimeter of the head, having its free ends inturned and anchored in sockets in the perimeter of the head, the intermediate portion thereof conforming to and resting in contact with the segmental outer end of said block, said intermediate portion having three apertures therein, the central one to accommodate the outer reduced end of the pin and the ones on opposite sides thereof being adapted to accommodate and permit protrusion of the outer ends of said feeler-studs.

12. In an inside diameter measuring and indicating gauge of the class described, the combination of a head being provided with a socket, a substantially rectangular bifurcated block having a curvate surface mounted for radial movement in the socket, said block being provided with a pair of fixed feeler pins on its curvate surface portion, said fixed pins extending beyond the perimeter of the head, a slidably adjustable double-studded feeler pin mounted in the furcations of said block and extending through the curvate surface beyond the perimeter of the head, spring means interposed between the bottom of the socket and the adjacent rectangular surface of the block for radially projecting the same, an indicator means, a tube connecting the head and the indicator means, a slidably operable rod mounted in said tube having a cam element on one end interposed between the furcations of said block and prevented from rotation thereby and engaging with the inner studded end portion of the said double-studded feeler pin and the other end engaging the operating mechanism of the indicator means.

JOHN C. NILSSON.
JOHN F. NILSSON.